March 24, 1953  W. T. MARCHMENT  2,632,330
APPARATUS FOR INDICATING THE DISPLACEMENT
OF AN OBJECT FROM A DATUM POSITION
Filed Nov. 7, 1949  3 Sheets-Sheet 1
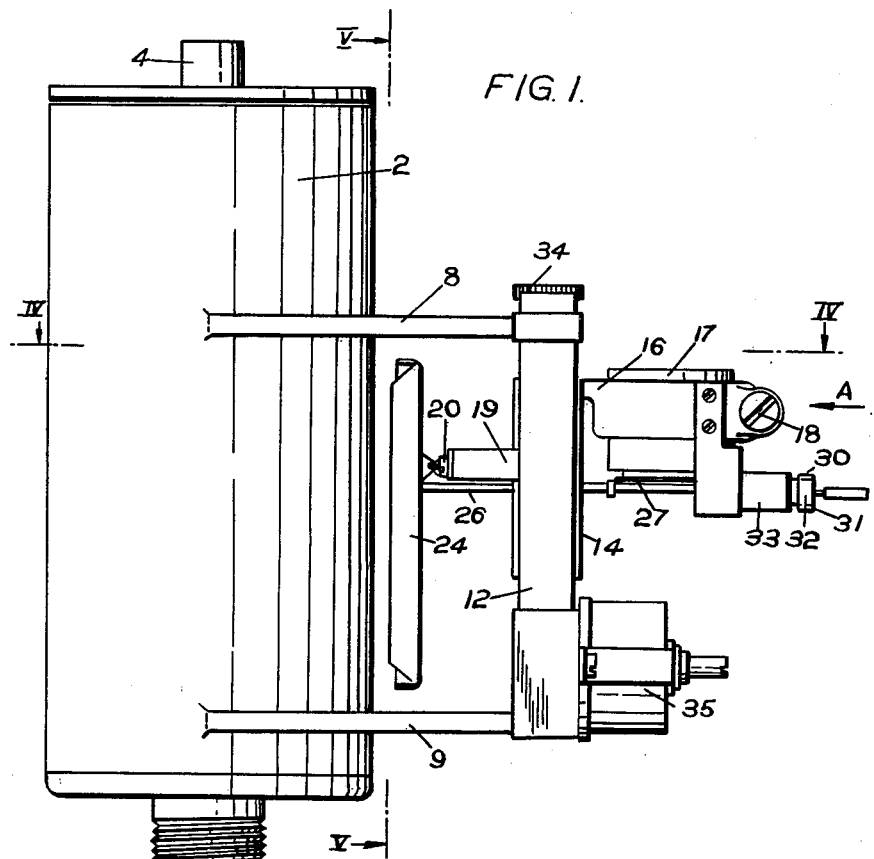
FIG. I.
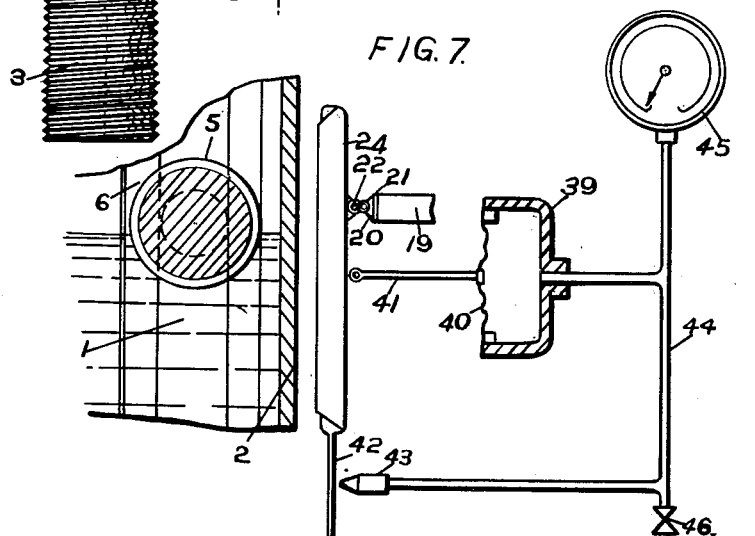
FIG. 7.
Inventor
William T. Marchment
By Ralph B. Stewart
Attorney March 24, 1953

W. T. MARCHMENT 2,632,330

APPARATUS FOR INDICATING THE DISPLACEMENT
OF AN OBJECT FROM A DATUM POSITION

Filed Nov. 7, 1949

Inventor
William T. Marchment
By Ralph B. Stewart
Attorney

March 24, 1953 W. T. MARCHMENT 2,632,330
APPARATUS FOR INDICATING THE DISPLACEMENT
OF AN OBJECT FROM A DATUM POSITION
Filed Nov. 7, 1949 3 Sheets-Sheet 3
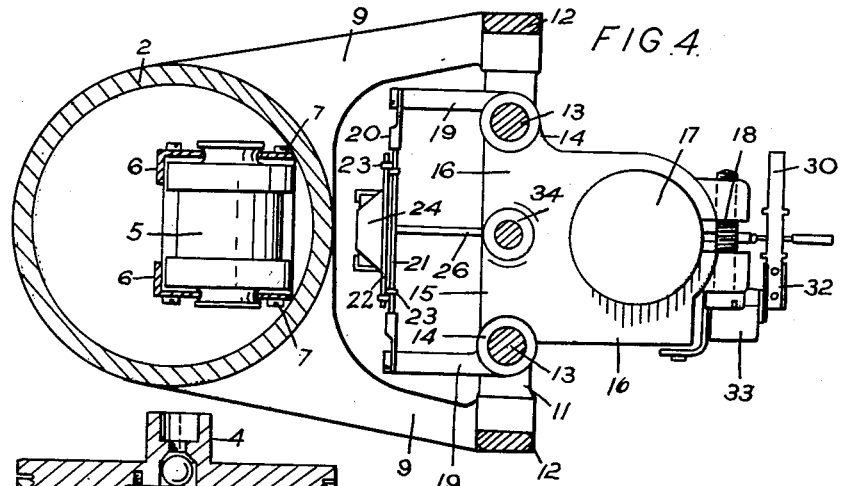
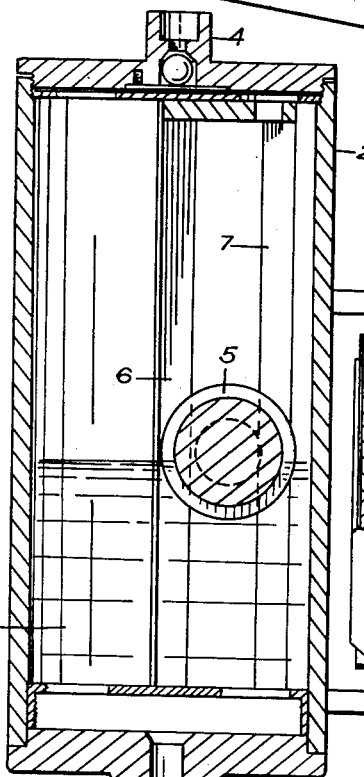
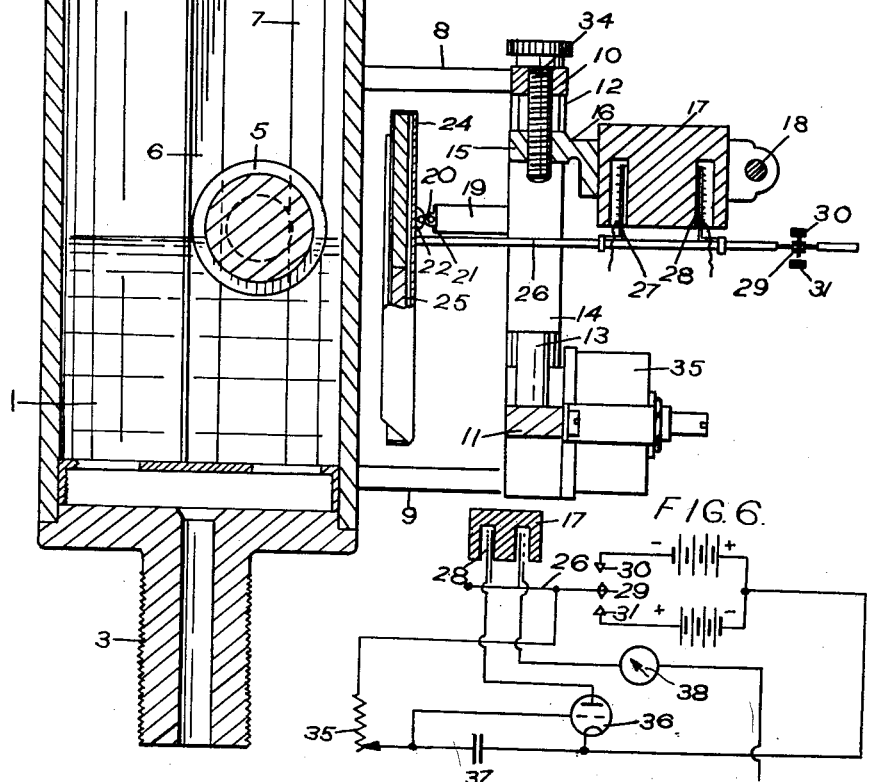
Inventor
William T. Marchment
By Ralph B. Stewart
Attorney Patented Mar. 24, 1953

2,632,330

UNITED STATES PATENT OFFICE 2,632,330

APPARATUS FOR INDICATING THE DISPLACEMENT OF AN OBJECT FROM A DATUM POSITION

William Thomas Marchment, Chiswick, London, England, assignor to Evershed & Vignoles Limited, London, England, a British company Application November 7, 1949, Serial No. 125,993
In Great Britain June 22, 1948

12 Claims. (Cl. 73—313)

1

It is often desirable, particularly in processing plants, to have a means of remotely indicating conditions in various parts of a process, but it is necessary to avoid apertures in the system through which an indicating means can be driven as, for instance, in a high pressure system. The present invention is designed to indicate conditions without mechanical connection from the inside to the outside of the system, thereby avoiding apertures, seals and glands.

According to the invention an instrument for indicating displacement of an object from a datum position has two members of magnetic material, one or both of which is a magnet. One of these members is disposed to move in accordance with the position of the object and to exert a magnetic force on the other member, which is pivoted so that the magnetic force produces a couple upon it proportional to the displacement of the object from its datum position. The pivoted member is subjected to a measured restoring force sufficient to retain it in a mean position.

In applying the invention, the first magnetic member may be contained within a vessel of non-magnetic material while the remainder of the apparatus is situated outside it. The restoring force may be applied in a variety of ways, for instance, electrically or by fluid pressure acting on a piston or diaphragm. In the particular instance in which it is desired to indicate the level of liquid in a vessel, the object may itself be a float comprising a bar magnet arranged to float on the surface of the liquid and so to move up and down with changes in level. Two ways of carrying the invention into effect will now be described by way of example with reference to the accompanying diagrams, in which:

Figure 1 is an elevation of an instrument for indicating the level of liquid in a vessel in which the restoring force is supplied by an electrodynamic system;

Figure 3 is a vertical section of Figure 2 on the line II—II;

Figure 4 is a horizontal section of Figure 1 on the line IV—IV;

Figure 6 is a diagram of the electrical circuit used with the apparatus shown in the preceding figures; and Figure 7 shows part of Figure 3 modified so as to show diagrammatically a second example of the invention in which the restoring force is provided by the action of compressed air.

2

Figures 2, 5:
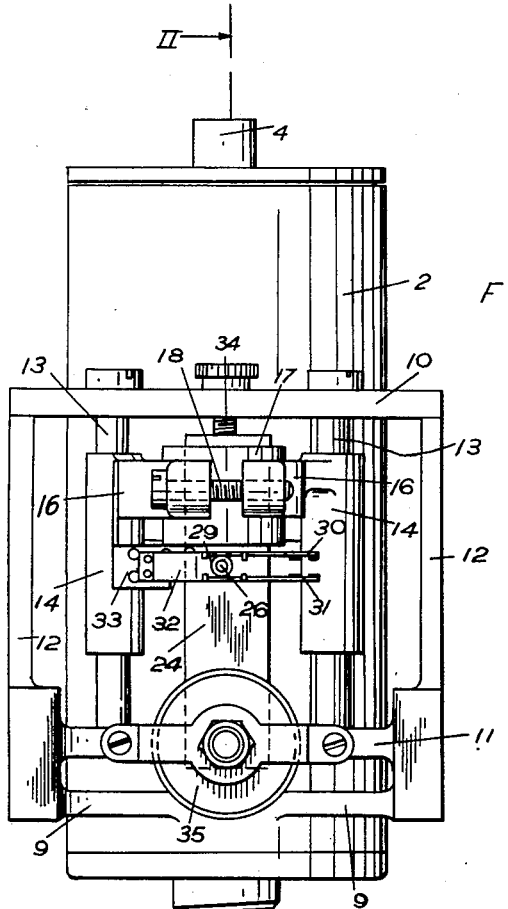
Figure 2 is an end view of Figure 1 seen in the direction of the arrow A.
Figure 5 is a vertical section of Figure 1 on the line V—V.

Referring to Figures 1 to 4, the float comprises cylindrical bar magnet 5, which is magnetized along its axis, floats between vertical guides 6, 6, and 7, 7, on the surface of the liquid 1 (such as mercury) contained in the non-magnetic vessel 2. Conditions in this vessel are regulated through the orifices 3 and 4. Attached to the side of this vessel by the horizontal arms 8 and 9 is a rectangular framework consisting of an upper horizontal member 10 and a lower horizontal member 11 connected by vertical members 12, 12. Between these vertical members cylindrical slides 13, 13, run from the lower horizontal member 11 to the upper member 10. Sleeves 14, 14, slide freely on the slides 13, 13 and are connected at their upper ends by a horizontal bar 15 which has an extension 16 on the side remote from the vessel 2, and which is shaped to encircle the pot magnet 17. The pot magnet 17 is clamped into this extension 16 by the action of a screw 18.

On the side of the sleeves 14, a pair of arms 19, 19 project towards the vessel 2, and carry at their extremities, members 20, 20, which support a cylindrical rod 21. A second cylindrical rod 22 is tied to the rod 21 by thin metal straps 23, best seen in Figure 4, so that the axes of both cylindrical rods lie substantially in a horizontal plane. The flexibility of the straps 23 however, allows the rod 22 to pivot to a limited extent in relation to the rod 21, while ensuring that the axes of the two rods remain parallel.

Attached to the rod 22 is a magnet housing 24 which carries a strip of magnetic material 25. This strip is shown in two halves in Figure 3 and Figure 5. This strip 25 lies in a vertical plane parallel to the vertical plane through the axis of the cylindrical bar magnet 5 and is so magnetized that its poles lie along the long vertical edges of the strip. Each of these vertical edges may be encased in a soft iron channel which acts as a pole-piece.

A short distance below the level at which the rod 22 is attached to the housing 24, a horizontal arm 26 is attached to the housing. This arm extends beneath the centre of the pot magnet 17 and carries near its extremity a contact disc 29, which is situated between upper and lower fixed contacts 30 and 31 respectively. These contacts are supported on an insulating block 32 which is itself supported on a bracket 33 attached to the side 34 of the projection 16. The arm 26 also carries a cylindrical coil former 27 on which is wound a coil 28, and the coil former and coil project into the airgap of the pot magnet 17.

The horizontal bar 15 together with the parts associated with it may be raised or lowered on the slides 13 by a screw 34 which engages in the horizontal bar 15 and is supported by the upper surface of the horizontal member 10. By this means, the pivotal point of the magnet strip 25 may be raised or lowered in relation to the vessel 2 and magnet 5 so that the surface level of the liquid 1 at which the magnet 5 exerts no turning moment on the magnet 25, may be adjusted at will.

The bottom horizontal member 11 carries a variable resistance 35.

It is preferred that the two magnetic members 5, 25, are arranged so that their like poles are opposite each other, which results in repulsion between the two members at any point in the travel of the magnet 5. As a result of this repulsion, the magnet 5 is pressed against the guides 6 and as the magnet moves up and down, it rolls on these guides which results in nearly frictionless movement. In operation, when the magnet 5 rises above the level of the pivot rods 21, 22, it will exert a repulsive force on the magnet 25, the line of action of the force being above these pivot rods. Thus, a clockwise moment (as seen in Figure 3) is exerted about the pivot rods and the rod 26 tends to turn in a clockwise direction so that the contact 29 touches the contact 31. The contact 31 is connected so that its polarity is positive in relation to the cathode of a thermionic triode valve 36 in Figure 6, and as the rod 26 is connected through the resistance 35 to one plate of a condenser 37, the other plate of which is connected also to the cathode of the valve 36, the plate of the condenser 37 becomes positively charged in relation to the cathode of the valve. This plate is connected to the grid of the valve 36 so that the positive charge on the plate of the condenser 37 results in an increased anode current through the valve. This anode current passes through the coil 28 and is measured by the ammeter 38. The coil 28 is so arranged that the effect of an increased current through the coil is to increase the upward pull exerted by the coil on the rod 26. Thus, the contact disc 29 will remain in contact with the lower fixed contact 31 until the current through the coil 28 is large enough to pull the contact disc 29 away from the contact 31 by counterbalancing the turning moment exerted on the magnet 25. Thus, the ammeter 38 gives a measure of this turning moment, and therefore an indication of the height of the axis of the magnet 5 above the level of the pivot rods 21, 22. If the magnet 5 falls below the level of these pivot rods the contact 29 will touch the contact 30 which is negative in relation to the cathode of the valve. Thus the anode current is decreased until the rod 26 drops and the contact is broken.

In Figure 7, the anode circuit and pot magnet are replaced by the air chamber 39 and flexible diaphragm 40 which acts through the connecting rod 41 on the magnet housing 24 so that an increase of pressure in the chamber 39 will turn the magnet and magnet housing in a clockwise direction about the pivot rods 21, 22. The lower end of the magnet housing 24 carries a vane 42 which moves in front of the fine orifice 43 so as to close or open it according to its position. The orifice 43 is connected to the main airline 44 which feeds the pressure chamber 39, the pressure in which is measured by the gauge 45. At a point in the airline 44 before the branch is taken off to the orifice 43 a constriction 46 is provided to stabilise the device.

In operation, the magnet 5 in rising above the level of the pivot rods 21, 22, will exert a clockwise moment on the magnet 25. A small movement of this magnet in a clockwise sense will move the vane 42 away from the orifice 43 allowing more air to leak away through this orifice, thus reducing the pressure in the chamber 39. Thus, less force is exerted on the diaphragm 40 with a corresponding reduction in the clockwise moment exerted by the connecting rod 41 on the magnet housing. By suitably designing the components of this system equilibrium is attained and the gauge 45 gives an indication of the displacement of the magnet 5 above the level of the pivot rods 21, 22. If the magnet 5 falls below these pivot rods the vane 42 closes the orifice 43 allowing less air to escape, so increasing the pressure in the chamber 39 and increasing the clockwise moment exerted by the connecting rod 41 on the magnet 25

I claim:

1. An apparatus for indicating displacement of a member from a datum position comprising, a pair of magnetic members, at least one of which is a magnet, means mounting one of said magnetic members for movement along a predetermined path from a datum position, said second magnetic member being elongated and extending at least for the length of said path, pivot means for supporting said second magnetic member alongside said path and in a position such that the magnetic force between said magnetic members produces a couple on said second magnetic member proportional to the displacement of said one magnetic member from said datum position, means to exert a restoring force on said second magnetic member so as to retain it in a mean position, and means to measure said restoring force.

2. An apparatus for indicating the displacement of a member from a datum position comprising, a pair of magnetic members, at least one of which is a magnet, means mounting one of said magnetic members for movement along a predetermined path, pivot means for supporting said second magnetic member alongside said path and in a position such that the magnetic force between said magnetic members produces a couple on said second magnetic member proportional to the displacement of said one magnetic member from said datum position, current-operated means including a coil for exerting a restoring force on said second magnetic member, means including contacts controlled by said second magnetic member to regulate the current in said coil to a value such as to retain said second magnetic member in a mean position, and means to measure the current in said coil.

3. An apparatus for indicating the displacement of a member from a datum position comprising, a pair of magnetic members, at least one of which is a magnet, means mounting one of said magnetic members for movement along a predetermined path from a datum position, said second magnetic member being elongated and extending at least for the length of said path, pivot means for supporting said second magnetic member alongside said path and in a position such that the magnetic force between said magnetic members produces a couple on said second magnetic member proportional to the displacement of said one magnetic member from said datum position, a permanent magnet, a coil rigidly connected to said second magnetic member and moving in the field of said permanent magnet, means including contacts controlled by said second magnetic member to regulate the current in said coil so that said coil exerts a restoring force on said second magnetic member such as to retain it in a mean position, and means to measure the current in said coil.

4. An apparatus for indicating the displacement of a member from a datum position comprising, a pair of magnetic members, at least one of which is a magnet, means mounting one of said magnetic members for movement along a predetermined path from a datum position, said second magnetic member being elongated and extending at least for the length of said path, pivot means for supporting said second magnetic member alongside said path and in a position such that the magnetic force between said magnetic members produces a couple on said second magnetic member proportional to the displacement of said one magnetic member from said datum position, a thermionic tube, a coil connected in the anode circuit of said tube such that the current in said coil is proportional to the anode current of said tube, a cylindrical pot magnet in which said coil moves, means to connect said coil rigidly to said second magnetic member, a contact controlled by the movements of said second magnetic member, means controlled by said contact in different positions for completing connections to sources of positive and negative polarity with respect to the cathode of said tube, a resistance connected between said contact and the grid of said tube, a capacity connected between the cathode and grid of said tube, said capacity being gradually charged or discharged by said contact through said resistance, and the resultant potential of said grid serving to control the anode current of said tube so as to retain said coil in a mean position, and means to measure the anode current of said tube.

5. An apparatus for indicating the displacement of a member from a datum position comprising, a pair of magnetic members, at least one of which is a magnet, means mounting one of said members for movement along a predetermined path from a datum position, said second magnetic member being elongated and extending at least for the length of said path, pivot means for supporting said second magnetic member alongside said path and in a position such that the magnetic force between said magnetic members produces a couple on said second magnetic member proportional to the displacement of said one magnetic member from said datum position, fluid operated means to apply a restoring force to said second magnetic member so as to retain it in a mean position, and means to measure said restoring force.

6. An apparatus for indicating the displacement of a member from a datum position comprising, a pair of magnetic members, at least one of which is a magnet, means mounting one of said members for movement along a predetermined path from a datum position, said second magnetic member being elongated and extending at least for the length of said path, pivot means for supporting said second magnetic member alongside said path and in a position such that the magnetic force between said magnetic members produces a couple on said second magnetic member proportional to the displacement of said one magnetic member from said datum position, a pressure vessel, said vessel being expandable by reason of a movable wall, a pipe connecting said vessel to a compressed air system, a connection between said movable wall and said second magnetic member such that air pressure on said vessel exerts a restoring force on said second magnetic member such as to retain it in a mean position, an orifice which allows air to leak away from said compressed air system so that the pressure in said vessel is reduced, a vane attached to said second magnetic member, such vane moving to open or close said orifice to a greater or less extent thereby decreasing or increasing the pressure in said vessel, and means to measure the pressure in said vessel.

7. An apparatus according to claim 1, wherein the second magnetic member is a strip-shaped permanent magnet having its magnetic poles along its long edges.

8. An apparatus according to claim 7, wherein the first magnetic member is a bar magnet, magnetised along its axis and disposed transversely to said strip-shaped magnet so that the poles of said bar magnet are opposite the like poles of said strip-shaped magnet.

9. An apparatus for indicating fluctuations in fluid level in a vessel about a datum point comprising, a float comprising a cylindrical bar magnet magnetised along its axis and floating in the fluid in said vessel with its axis arranged horizontally, vertical guides in said vessel to restrain horizontal movements of said magnet, a second magnetic member situated outside said vessel and arranged parallel with said guides, pivot means for said second magnetic member such that the magnetic force between said bar magnet and said second magnetic member produces a couple on said second magnetic member proportional to the displacement of said bar magnet from said datum point, means to exert a restoring force on said second magnetic member so as to retain it in a mean position, and means to measure said restoring force, said cylindrical bar magnet being pressed against said guides by said magnetic force so that said bar magnet rolls up and down said guides without rubbing friction.

10. An apparatus according to claim 9, wherein said second magnetic member is a strip of permanently magnetised magnetic material having its magnetic poles along its long edges, said strip being so disposed that its poles are opposite like poles of the cylindrical bar magnet, the edges of the strip lying in a vertical plane parallel to the vertical plane through the axis of the cylindrical magnet.

11. An apparatus for indicating displacement from a datum position, comprising an elongated magnetic member, means mounting said member for pivotal movement about a transverse axis, a second magnetic member, one at least of said magnetic members being a permanent magnet, means mounting said second magnetic member for movement along a substantially straight-line path parallel with the length of said elongated member, means controlling the movement of said second magnetic member along said path from a datum position in accordance with the displacement to be indicated so as to produce a torque on said elongated member proportional to said displacement, means for producing an opposing torque to maintain said elongated member in a mean position, and means for measuring said opposing torque.

12. An apparatus for indicating displacement from a datum position, comprising an elongated magnetic member, means mounting said member for pivotal movement about a transverse axis, a second magnetic member, one at least of said magnetic members being a permanent magnet, means mounting said second magnetic member for movement along a substantially straight-line path parallel with the length of said elongated member, means controlling the movement of said second magnetic member along said path from a position opposite said transverse axis in accordance with the displacement to be indicated so as to produce a torque on said elongated member proportional to said displacement, means responsive to movement of said elongated member from its mean position for producing an opposing torque to return said elongated member to its mean position, and means for measuring said opposing torque.

WILLIAM THOMAS MARCHMENT.

REFERENCES CITED

The following references are of record in the file of this patent:

UNITED STATES PATENTS

| Number | Name | Date |
|---|---|---|
| 1,621,835 | Davis | Mar. 22, 1927 |
| 1,911,372 | Lenehan | May 30, 1933 |
| 2,233,572 | Atkins | Mar. 4, 1941 |
| 2,339,922 | Gatewood | Jan. 25, 1944 |
| 2,527,771 | Smyth-Davila | Oct. 31, 1950 |